United States Patent [19]

Auerbach

[11] Patent Number: 4,596,308

[45] Date of Patent: Jun. 24, 1986

[54] SAWHORSE INCORPORATING TOOL TRAY

[76] Inventor: Robert S. Auerbach, 1843 Wollam St., Los Angeles, Calif. 90065

[21] Appl. No.: 763,459

[22] Filed: Aug. 7, 1985

[51] Int. Cl.[4] .......... F16M 11/00

[52] U.S. Cl. .......... 182/129; 182/151; 182/181; 182/224

[58] Field of Search .......... 182/129, 181-186, 182/224-226, 153, 151

[56] References Cited

U.S. PATENT DOCUMENTS

| | | | |
|---|---|---|---|
| 321,221 | 6/1885 | Johnson | 182/151 |
| 2,324,196 | 7/1943 | Crozier | 182/186 |
| 2,635,013 | 4/1953 | Doucette | 182/151 |
| 2,664,319 | 12/1953 | Doucette | 182/151 |
| 2,698,771 | 1/1955 | O'Rourk | 182/151 |
| 3,016,104 | 1/1962 | Johnson | 182/129 |
| 3,241,633 | 3/1966 | Bond | 182/186 |
| 4,433,753 | 2/1984 | Watson | 182/181 |

*Primary Examiner*—Reinaldo P. Machado
*Attorney, Agent, or Firm*—Freilich, Hornbaker, Rosen & Fernandez

[57] ABSTRACT

A sawhorse having a tool tray with a storage space for holding tools and four legs that are attached to the tool tray. The handle of the tool tray is the working surface of the sawhorse and the legs raise the handle to the desired height above the floor. The four legs are removable from the tray to facilitate transportation of the sawhorse. A wide flat surface is provided on the top of the handle that allows the balancing and clamping of a work piece horizontally on the sawhorse. The ends of the handle are flush with the outer surfaces of the legs. The legs are bolted to the outside of the tool tray vertical to the ground allowing the placement and clamping of a work piece to the sawhorse ends vertical to the ground.

11 Claims, 4 Drawing Figures

SAWHORSE INCORPORATING TOOL TRAY

BACKGROUND OF THE INVENTION

1. Field of the Invention

The present invention pertains to the carpentry art, and more particularly, to a sawhorse having a specially positioned top rail, a tool tray, and removable legs.

2. Background Art

Sawhorses are traditionally made of wood with four legs and a top rail. Two legs are located near one end of the rail forming an inverted V shape and two other legs are located near the other end of the rail also forming an inverted V shape. Each set of legs is attached to the top rail at an angle in order to support the rail and provide angular stability of the sawhorse in relation to the ground. Some sawhorses are made with metal connecting pieces at each end that facilitate the fabrication of the sawhorse from five pieces of wood.

Generally two sawhorses are used together. The work piece is placed across the two sawhorses. If a large panel such as a piece of plywood is to be cut in the middle, an additional worker is required to hold in place the portion that is being cut in order to avoid binding the saw and to avoid damage to the cut portion when the cut is finished. If the top rail is positioned with narrow edge toward the top, the clamping or balancing of the panel on the rail is difficult.

Cutting operations on the edge of a large panel, such as a door, are not easy when positioned horizontally on the top rails of the sawhorses even with clamps because the panel tends to move with the sawhorses across the ground when pressure is applied to the edge. Traditional sawhorses are also not suitable for providing support for edge cutting operations when the panel is in a vertical position against the ends of the sawhorses because the panel cannot be easily clamped or securely leaned against the ends of the sawhorses due to the fact that sawhorse legs are not usually vertical to the ground.

Transportation of traditional sawhorses and tools for use with the sawhorses from one work site to another is awkward. There are no trays or other means on the sawhorses for carrying the tools such as hammers, chisels, scribes, and drills that are used with the sawhorses. The carpenter must carry his tools separately. Two or more trips are therefore required to get the sawhorses and tools in position for use.

Consequently, the need exists for improvements in sawhorses both in the ability to control work pieces and in facilitating transportation of the sawhorses and tools to a new job site.

SUMMARY OF THE INVENTION

The present invention provides a sawhorse designed to satisfy the aforementioned needs. The placement of the top rail allows a large panel to be more easily balanced or clamped to the sawhorse. Changes in the positioning of the legs allows a work piece to be placed vertically against an end of the sawhorse for edge cutting operations with the force directed into the floor. A tool tray with a storage space for small tools provides the frame for the sawhorse to which the legs are removably attached.

The first change in the positioning of the top rail locates a wide edge toward the top instead of a narrow edge. The resulting surface improves the ability of a single sawhorse to retain a cut panel in position after a cut is finished with or without a clamp. The second change in the positioning of the top rail locates the ends of the top rail flush with the outer surfaces of the legs allowing a large panel such as a door to be supported against the ends of the sawhorse perpendicular to the floor. Clamps may then be positioned on the panel and the legs to secure the panel to the sawhorse. The sawhorse primarily holds the panel in a vertical position. Most of the pressure on the edge of the panel during the cutting operation is transmitted into the floor instead of horizontally across the top rail of the sawhorse.

The top rail is incorporated into the tool tray as the handle for the tool tray. The legs are removably attached to each end of the tool tray to complete the sawhorse and raise the top rail to the desired working height.

Other features and advantages of the present invention will become apparent from the following detailed description, taken in conjunction with the accompanying drawings, which illustrate, by way of example, the principles of the invention.

DETAILED DESCRIPTION OF THE PREFERRED EMBODIMENT

Figure 1:
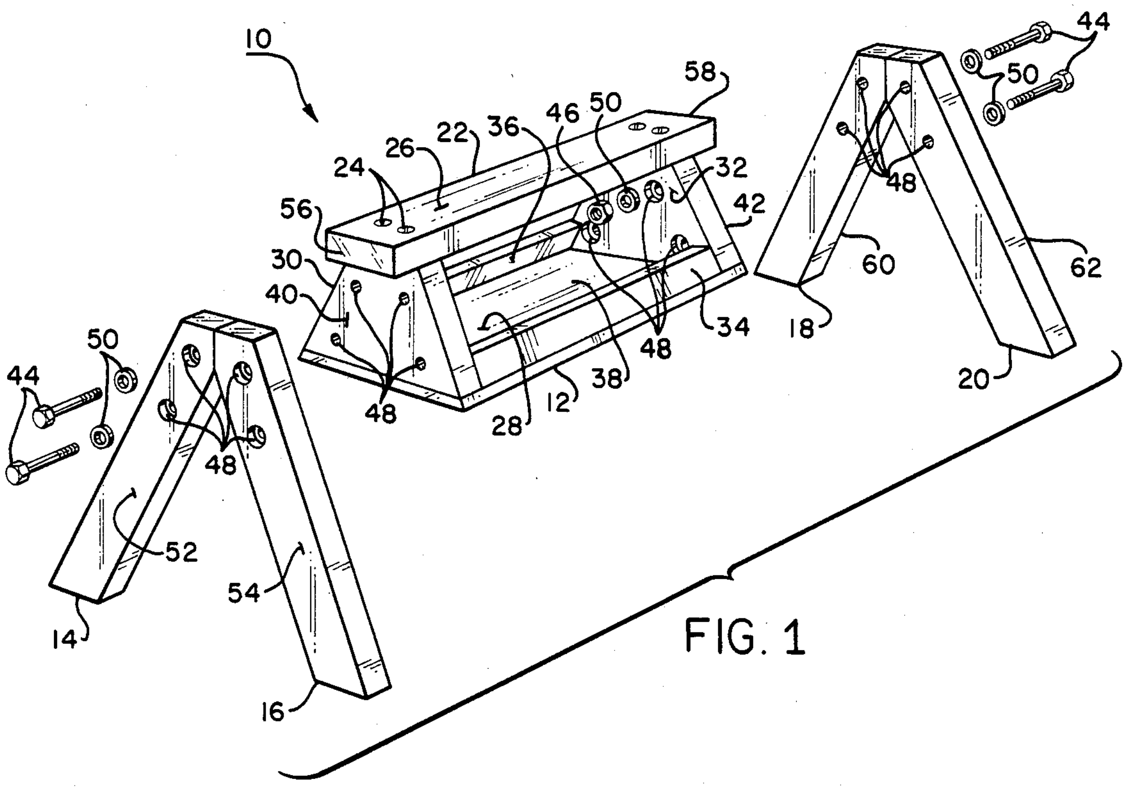
FIG. 1 is an exploded perspective view of a preferred embodiment of a sawhorse in accordance with the present invention.

Referring now to the drawings, and more particularly to FIG. 1, there is illustrated an exploded perspective view of the preferred embodiment of a sawhorse, generally designated 10, of the present invention. A tool tray 12 provides a strong frame for the sawhorse 10. The first, second, third, and fourth legs 14, 16, 18, and 20, respectively, are attached to the tool tray 12 and provide a leg means to raise the top rail 22 of the tray 12 to a desired working height above the floor. The legs 14, 16, 18, and 20 may be removed from the tool tray 12, if desired, as illustrated in FIG. 1 for storage or transportation of the sawhorse 10. The top rail 22 serves both as the handle for the tool tray 12 and the working surface of the sawhorse 10. The tool tray 12 allows the worker to place his tools on the sawhorse 10 and carry both the sawhorse 10 and tools to the new work site in one trip.

The tool tray 12 is unitarily fabricated using, for example, screws 24. The top rail 22 has a top flat portion 26 that is parallel to the floor when the sawhorse 10 is in use. The top flat portion 26 provides a wide surface for supporting a work piece. A tray bottom 28 is spaced from the top rail 22 and is parallel to the top flat portion 26. First and second supports 30 and 32, respectively, are placed at opposite ends of the tray bottom 28 and attach the top rail 22 to the tray bottom 28. A first tray side 34 on the right upper edge of the tray bottom 28 extends between the first and second supports 30 and 32. A second tray side 36 on the other side of the tray bottom 28 also extends between the first and second end supports 30 and 32. Together the first and second supports 30 and 32, the first and second sides 34 and 36, and the tray bottom 28 define a storage space 38 that holds tools in the tool tray 12.

The first and second legs 14 and 16 are positioned in an inverted V shape on the outer surface 40 of the first support 30. The third and fourth legs 18 and 20 are positioned in an inverted V shape on the outer surface 42 of the second support 32. The legs 14, 16, 18, and 20 are removably coupled to the supports 30 and 32 by means of fasteners such as the machine bolts 44 secured by hex nuts as, for example, hex nut 46. The bolts 44 pass through the screw holes 48 in both the legs 14, 16, 18, and 20 and the supports 30 and 32. Washers such as washers 50 are supplied adjacent the heads of the bolts 44 and the hex nuts 46 in order to prevent the heads and nuts from entering the wood from which the legs 14, 16, 18, and 20 and the supports 30 and 32 are fabricated.

In order to allow the secure placement and clamping of a work piece such as a large panel or door on the ends of the sawhorse, the outer surfaces 52 and 54 of the first and second legs 14 and 16 are located in the same plane as the first end 56 of the top rail 22. Similarly, the outer surfaces 60 and 62 of the third and fourth legs 18 and 20 are located in the same plane as the second end 58 of the top rail 22. Both planes are perpendicular to the floor allowing a work piece to be held vertically by the sawhorse 10 at either end.

Figure 2:
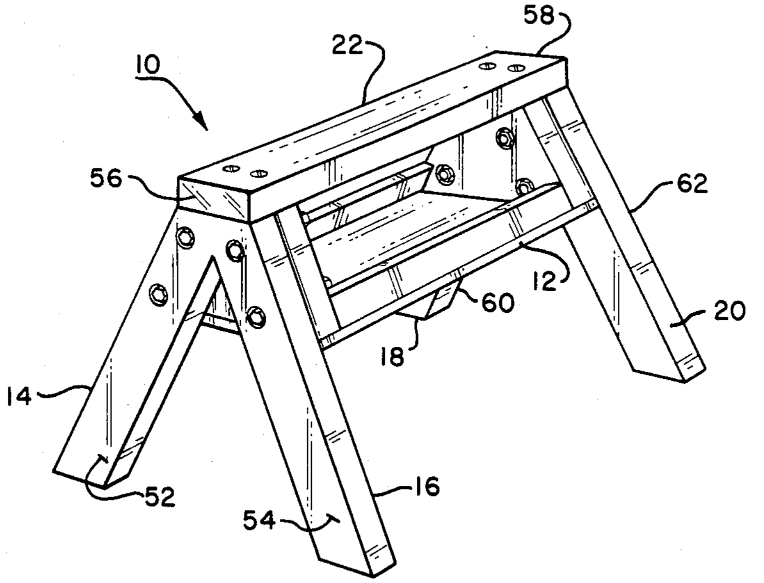
FIG. 2 is a perspective view of the assembled sawhorse of FIG. 1.

FIG. 2 is a perspective view of the assembled sawhorse 10 of FIG. 1. The tool tray 12 serves as a sturdy frame for the sawhorse 10. The top rail 22 is the working surface for the sawhorse 10. The four legs 14, 16, 18, and 20 are attached to the ends of the tool tray 12 to raise the top rail 22 to the desired working height. For example, the working height may be 24 inches or 32 inches depending upon the desires of the carpenter. Longer legs are substituted for shorter legs if a higher height is desired.

FIG. 2 shows the assembled alignment of the outer surfaces 52 and 54 of the first and second legs 14 and 16 and the first end 56. FIG. 2 also shows the assembled alignment of the outer surfaces 60 and 62 of the third and fourth legs 18 and 20 and the second end 58. The alignments of these surfaces allow a panel to be positioned vertically and clamped securely against the ends of the sawhorse 10.

Figure 3:
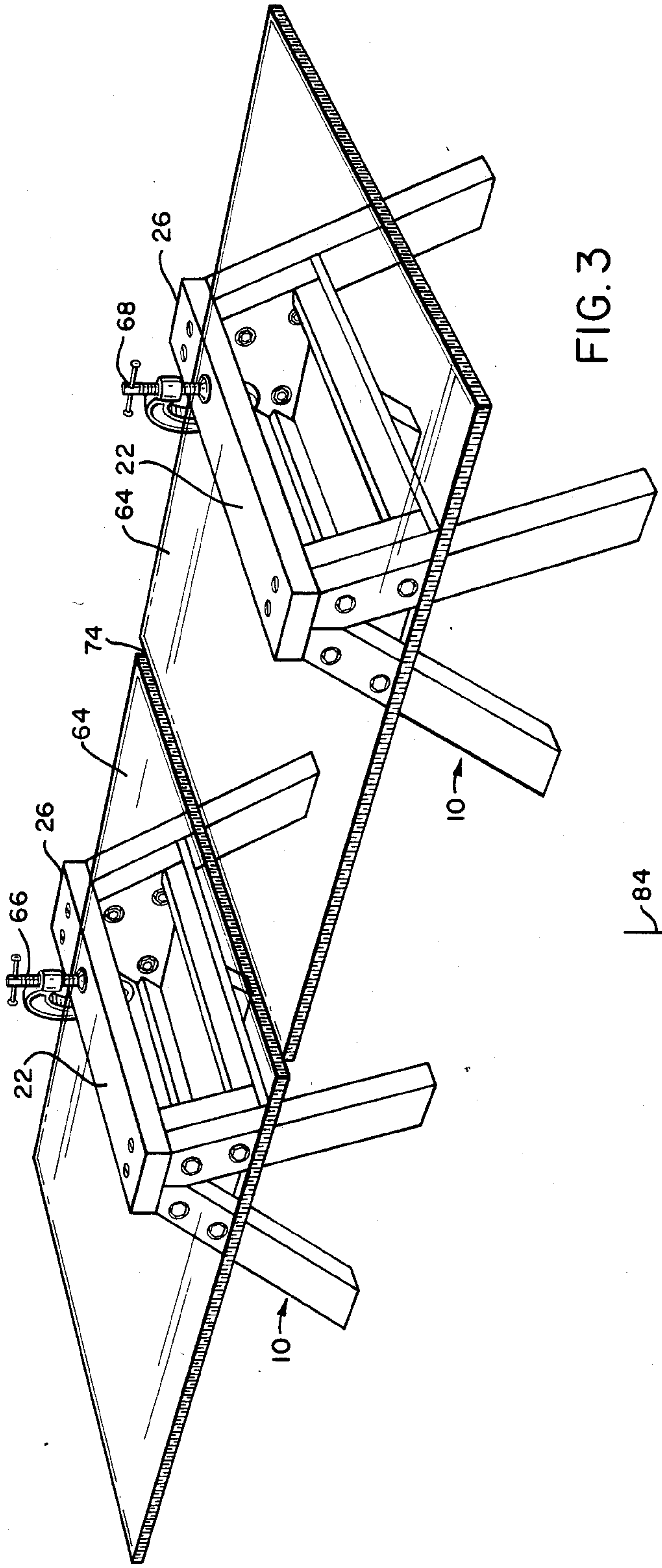
FIG. 3 is a perspective view of two sawhorses of the present invention with a cut work piece clamped on top.

FIG. 3 is a perspective view of two sawhorses 10 of the present invention with a work piece 64 that has been cut secured on the top flat portions 26 of the top rails 22 by the clamps 66 and 68. Some traditional sawhorses position the top rails with narrow sides of the boards up instead of wide sides. The present sawhorses 10 position the top rails 22 with wide sides of the boards up thereby presenting wider surfaces to the work piece 64 than are available on traditional sawhorses. The added width substantially enhances the stability of the work piece 64 on the top flat portions 26 as the work piece 64 is being cut and when the cut is finished. The wider surfaces allow one man to position an uncut work piece 64 such as a sheet of plywood on the top rails 22 and make the cut 74 by himself without the aid of another worker. The work piece 64 remains supported and balanced during the cutting operation and remains supported and balanced after the cut 74 is completed thereby relieving any pressure on the saw blade. The result is greater cutting accuracy and safety for the worker.

Figure 4:
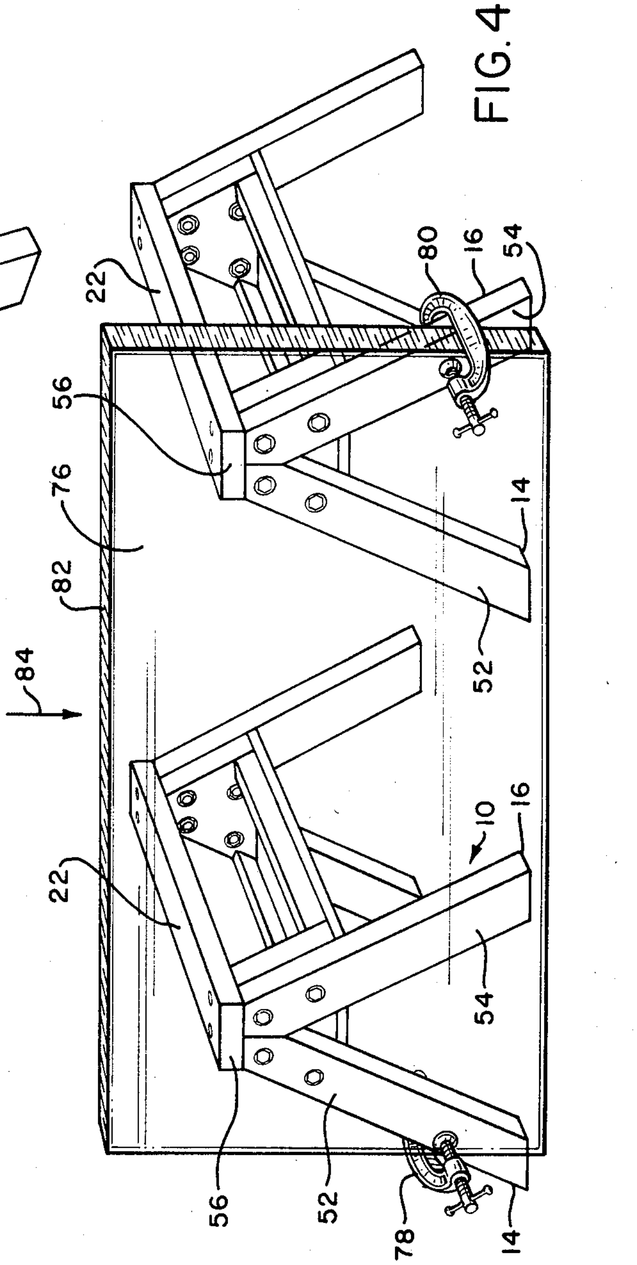
FIG. 4 is a perspective view of two sawhorses of the present invention with work piece clamped vertically on the ends.

FIG. 4 is a perspective view of two sawhorses 10 of the present invention with a work piece 76 such as a door positioned vertically on the ends of the sawhorses 10 and secured in position by the clamps 78 and 80. On traditional sawhorses, the top rails jut out past the legs making the clamping of a work piece on the ends of the sawhorses difficult if not impossible. The present sawhorses 10 have ends with all of the surfaces in alignment, i.e. the first ends 56 of the top rails 22 and the outer surfaces 52 and 54 of the legs 14 and 16 are all in the same vertical plane making the clamping of a work piece 76 against the ends easy, secure, and stable.

When the work piece is in a vertical position, the forces of a cutting operation made on the edge 82 are directed down into the floor as indicated by the arrow 84. Cutting operations on the edge 82 include chiseling and drilling for hinges and locks and planing and sanding for fitting of the work piece 76 into a door frame or other space. Traditional sawhorses are either not used for edge operations or the work piece is placed horizontally on the top rails. When force is placed on the edge of a horizontal work piece, the work piece tends to move across the top rails. The vertical positioning of the work piece 76 as illustrated in FIG. 4 rigidly butts the work piece 76 against the floor allowing the use of any force required against the edge 82 as illustrated by the arrow 84 without concern that the work piece 76 will move away in the direction of the arrow 84.

In view of the above, it may be seen that a sawhorse is provided that substantially improves the ability, safety, and security of a carpenter to work on a work piece in both the vertical and horizontal positions. In addition, the sawhorse allows the carpenter to move from work site to work site with all of his small tools and the sawhorse in one safe and easy transition. Of course, the structure may be variously implemented and variously used depending upon specific applications. Accordingly the scope hereof shall not be referenced to the disclosed embodiment, but on the contrary, shall be determined in accordance with the claims as set forth below.

I claim:

1. A sawhorse comprising:

a tool tray having:

a top rail having first and second ends;

a tray bottom spaced from the top rail; and first and second supports spaced from each other and attaching the top rail to the tray bottom;

leg means for coupling to the tool tray and raising the top rail to a working height above the floor having:

first and second legs positioned in an inverted V shape on the first support, and third and fourth legs positioned in an inverted V shape on the second support;

the first end of the top rail in the same plane as the outer surfaces of the first and second legs; and coupling means for coupling the leg means to the tool tray.

2. A sawhorse according to claim 1 wherein the top rail has a top flat portion parallel to the floor.

3. A sawhorse according to claim 2 wherein the tray bottom is parallel to the top flat portion of the top rail and the tool tray has a first tray side on one of the upper edges of the tray bottom extending between the first and second supports and a second tray side spaced from the first tray side on the other of the upper edges of the tray bottom extending between the first and second end supports whereby the first and second supports, the first and second sides, and the tray bottom define a storage space.

4. A sawhorse according to claim 1 wherein the plane of the first end of the top rail is perpendicular to the floor.

5. A sawhorse according to claim 4 wherein the second end is in the same plane as the outer surfaces of the third and fourth legs and the plane of the second end is perpendicular to the floor.

6. A sawhorse according to claim 1 wherein the coupling means are removable fasteners passing through the first leg and the first support, the second leg and the first support, the third leg and the second support, and the fourth leg and the second support whereby the legs are removable for transportation of the sawhorse.

7. A sawhorse for use on a floor comprising:

a tool tray having:

a top rail having a top flat portion parallel to the floor and first and second ends;

a tray bottom spaced from the top rail and parallel to the top flat portion; and first and second supports spaced from each other and attaching the top rail to the tray bottom;

leg means for coupling to the tool tray and raising the top rail to a working height above a floor having first and second legs positioned in an inverted V shape on the first support and third and fourth legs positioned in an inverted V shape on the second support and positioning the outer surfaces of the first and second legs in the same plane as the first end of the top rail perpendicular to the floor; and coupling means for coupling the leg means to the tool tray.

8. A sawhorse according to claim 7 wherein the second end is in the same plane as the outer surfaces of the third and fourth legs and the plane of the second end is perpendicular to the floor.

9. A sawhorse according to claim 7 wherein the tray bottom is parallel to the top flat portion of the top rail and the tool tray has a first tray side on one of the upper edges of the tray bottom extending between the first and second supports and a second tray side spaced from the first tray side on the other of the upper edges of the tray bottom extending between the first and second end supports whereby the first and second supports, the first and second sides, and the tray bottom define a storage space.

10. A sawhorse according to claim 7 wherein the coupling means are removable fasteners passing through the first leg and the first support, the second leg and the first support, the third leg and the second support, and the fourth leg and the second support whereby the legs are removable for transportation of the sawhorse.

11. A sawhorse according to claim 10 wherein the tray bottom is parallel to the top flat portion of the top rail and the tool tray has a first tray side on one of the upper edges of the tray bottom extending between the first and second supports and a second tray side spaced from the first tray side on the other of the upper edges of the tray bottom extending between the first and second end supports whereby the first and second supports, the first and second sides, and the tray bottom define a storage space.

* * * * *